Sept. 12, 1933.  J. H. GRAYSON ET AL  1,926,533
AUTOMATIC HEAT REGULATOR
Filed March 11, 1932   2 Sheets-Sheet 1
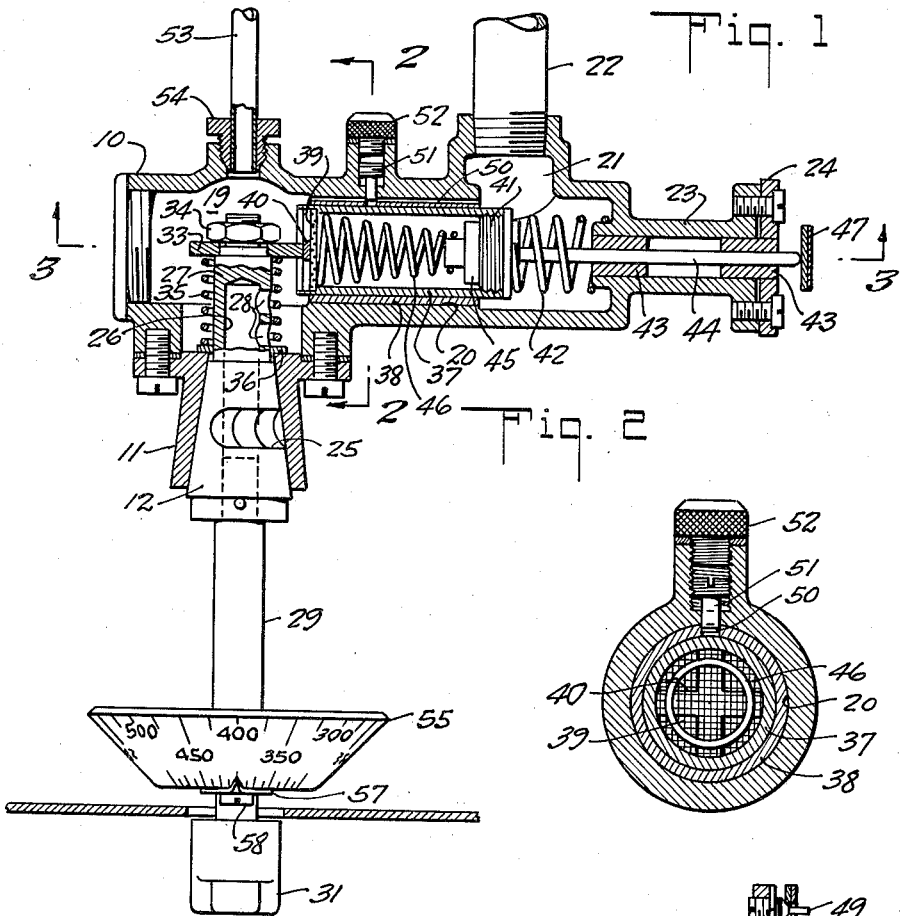
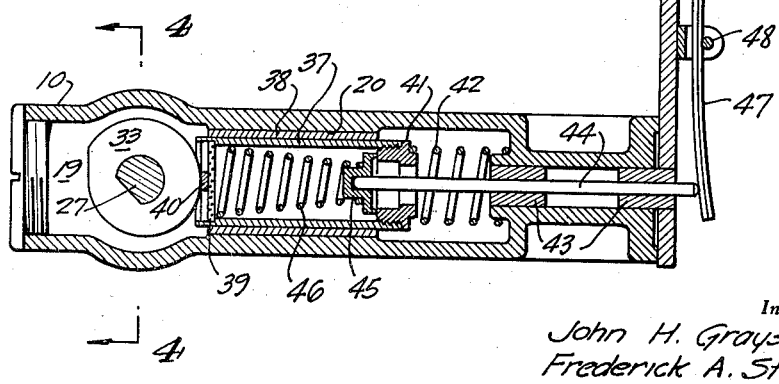
Inventors
John H. Grayson
Frederick A. Straub
By Ernest L. Wallace
Attorney

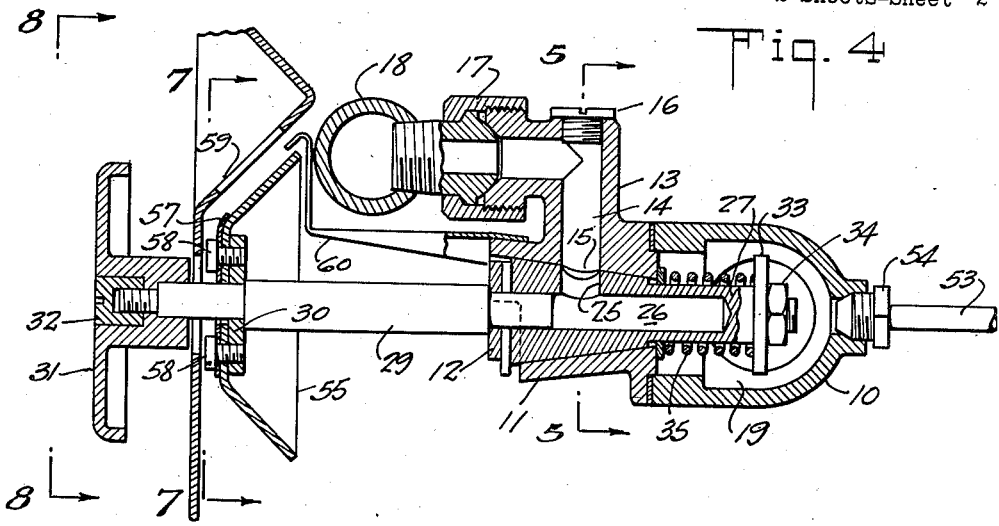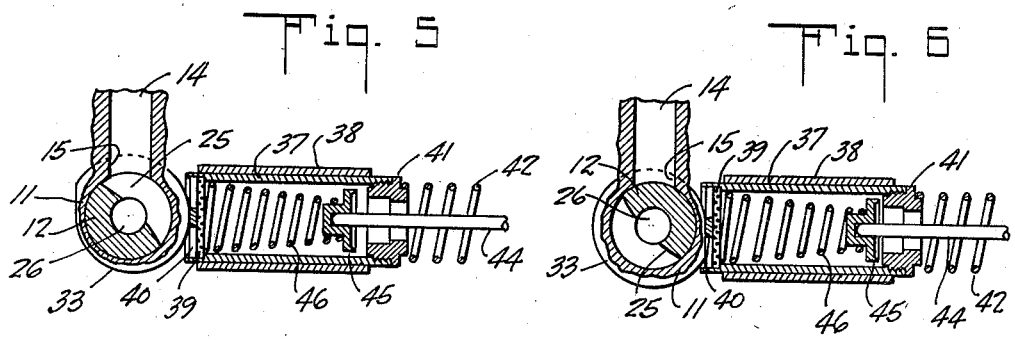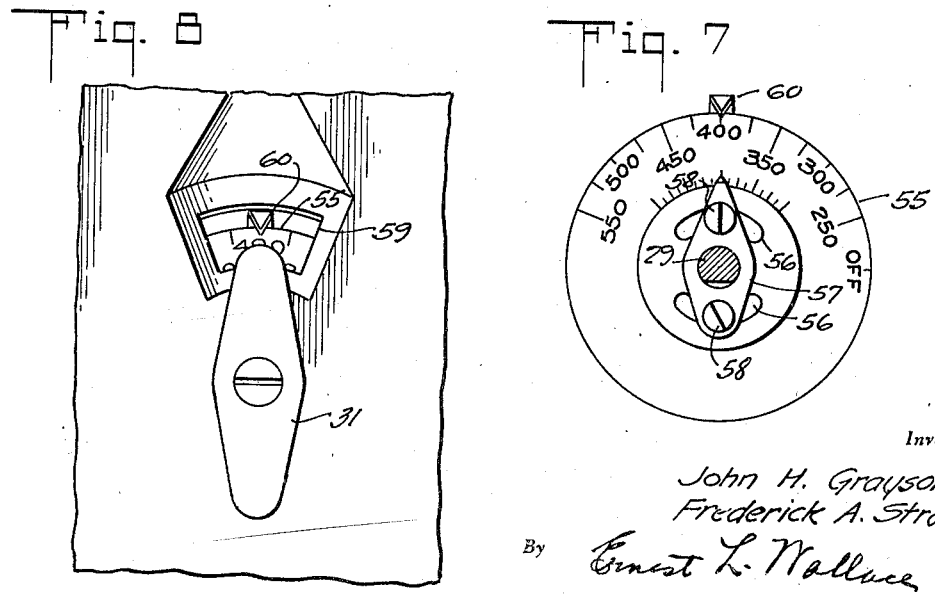

Patented Sept. 12, 1933

1,926,533

UNITED STATES PATENT OFFICE 1,926,533

AUTOMATIC HEAT REGULATOR

John H. Grayson and Frederick A. Straub, Lynwood, Calif., assignors to Grayson Appliance Company Limited, Lynwood, Calif., a corporation of California Application March 11, 1932. Serial No. 598,216

18 Claims. (Cl. 236—15)

This invention relates to automatic heat regulators for cooking appliances such as stoves and the like and pertains more especially to a unit which may be mounted on and supported by a gas supply pipe such as a gas manifold. The invention enables the use of a single casing for the gas supply cock and an automatic valve mechanism with a thermostatic regulator mounted thereon. The type of device disclosed herein provides a single member for controlling both the gas supply and the regulation of temperature. In automatic heat regulators of the class described, accurate assembly of the elements is required in order to insure the maintenance of selected temperatures. A slight deviation from the proper relative position of actuating elements results in temperatures of a substantial difference from the correct temperatures. It is desirable that the various elements of the structure be assembled in a unit such that after initial adjustment of the assemblage the parts are not subject to disturbance. It is also desirable that a unit be provided which is sensitive, simple, sturdy, compact and capable of being mounted on a cooking appliance in a place out of the way of the operator and adaptable to any standard type of stove.

The objects of this invention are to provide a heat regulator having any or all of the desired features before mentioned. These objects together with other objects which will be apparent from the subjoined specification are obtained by means of the embodiment of my invention illustrated in the accompanying drawings, in which:

Fig. 1 is a longitudinal section of a unit; Fig. 2 is a section on an enlarged scale as seen on the line 2—2 of Fig. 1; Fig. 3 is a section as seen on the line 3—3 of Fig. 1; Fig. 4 is a section as seen on the line 4—4 of Fig. 1; Fig. 5 is a section as seen on the line 5—5 of Fig. 1; Fig. 6 is a section similar to Fig. 5 with the gas cock in closed position; Fig. 7 is a section as seen on the line 7—7 of Fig. 1; and Fig. 8 is a fragmentary face view of the knob and dial as mounted on a stove.

Referring more particularly to the drawings, a casing has an elongated portion 10 to which a plug valve section 11 is secured by suitable bolts. The section 11 has a tapered bore in which is mounted a valve plug 12. An extension 13 on the section 11 has a bore 14 extending therethrough and opening to the tapered plug bore through a port 15. The extension 13 has a lateral branch with a bore. For convenience in manufacture and servicing, the bore 14 in the extension has a detachable cap 16. A fitting 17 provides for connection of the casing with a gas manifold 18. The elongated section 10 of the casing has a gas chamber 19 in line with the axis of the plug and a central bore 20 extending therefrom to an outlet chamber 21. A boss is provided on the casing at the outlet chamber to receive an outlet pipe 22 leading to the burner of the cooking appliance. The section 10 is extended to provide a housing portion 23 for the stem and bearings of an automatic valve and is also flanged at its outer end for mounting of a plate 24.

The gas plug 12 is of conical form and has a peripheral port 25 extending substantially 180° around the axis and communicating with a central way or passage 26 which reaches into an extension 27 having openings 28 communicating with the chamber 19. An operating shaft 29 is pinned to the plug and is shouldered at its outer end to receive a disk 30 fixed to the shaft 29 in any suitable manner. For this purpose the reduced portion of shaft 29 may be flattened on one side and the opening in disk 30 made of corresponding shape. On the outer end of shaft 29 is a knob 31 which may be locked in position by a nut 32 threaded on the shaft. The structure just described is such that the rotary plug may be turned to open position as shown in Figs. 1 and 5 and may have a range of angular movement such that the inlet port 14 will be in open communication with the way 26.

The end of extension 27 is reduced in diameter and a cam 33 is mounted thereon. The cam is held in position by a lock nut 34 threaded on the end of the extension. Mounted over the extension 27 and seating against the cam is a compression spring 35 seating at its other end against a washer 36 to prevent leakage of gas. The cam 33 is rotated with the plug and acts upon a valve seat sleeve. This sleeve marked 37 is slidably mounted in a liner 38 within the central bore and is internally shouldered for seating of a screen 39. Mounted over the screen is a follower 40 which the cam 34 directly engages. At the other end of the sleeve is a seat bushing 41 having a boss for mounting thereover a compression spring 42 extending between the bushing and the end of valve casing section 10. Spring 42 maintains the sleeve 37 in contact with the cam. The casing extension 23 has a bore in which are mounted spaced bearings 43 for reciprocation of a valve stem or actuating rod. The outer bearing 43 extends through the plate 24 which is fixed to the flange on the extension 23 by suitable bolts. Slidably mounted in the bearings 43 and concentric with the bore 20 is a valve stem 44 having a valve head 45 which coacts with the seat 41.

A compression spring 46 urges the valve 45 toward its seat. The thermostatic actuator which is responsive to heat variations comprises a bimetallic leaf 47 bearing at one end against the actuating rod 44, and fulcrumed on a pin 48 mounted in a bracket on plate 24. The other end of the leaf is mounted on an adjustable pin 49.

The unit is so mounted that the thermostatic actuator is in position to be affected by the heat whose temperature is to be controlled, such as in the oven of a stove. With the structure as before described, the gas cock may be turned from the closed position shown in Fig. 6 to open position. The cam 33 has a surface such that when opened there is a rise acting against the sleeve which increases with the angular movement of the gas cock, thereby moving the seat sleeve away from the valve head 45. Assuming the valve head is stationary, the valve opening will be increased and a larger flow of gas from the inlet to the outlet chamber 21 and thence to the burner. By adjusting the position of the cam through manipulation of the gas cock the position of valve seat 41 with relation to the valve head is determined. Assuming the burner is lighted, the oven heats and the thermostatic actuator 47 responds to the heat to move valve 45 away from its seat when the temperature drops and to allow its return toward the seat on increase of temperature. There is thus a movement of the automatic valve 45 proportional to the temperature variations. A by-pass channel 50 is formed in liner 38 placing the inlet chamber 19 in communication with the outlet chamber 21. A boss is provided for housing a screw valve 51 adjustable to regulate the flow of gas through the by-pass. A cap 52 covers the head of the screw valve. There is a minimum lower temperature, such as for illustration 250° F. at which the oven is operated. Regardless of whether the automatic valve is open or closed, there will be a flow of gas through the by-pass. In the event the burner should become extinguished by failure of sufficient gas to flow through the by-pass, a pilot burner is provided. The tube leading to the pilot burner is indicated by 53 and is connected by a compression coupling 54 to the chamber 19. Obviously, this pilot burner will only be lighted when the gas cock is turned on.

Secured to the disk 30 is a dial 55. The dial has arcuate elongated openings 56 to receive screws which extend through a pointer 57 fixed to the disk 30 by screws 58. Obviously, the angular position of the dial on shaft 29 may be adjusted. On the outer periphery of the dial are temperature graduations which may be viewed through a window 59 in the manifold cover plate or like plate. A pointer 60 is mounted on the casing and is extended to coact with the temperature graduations. The dial has an inner set of graduations for correcting the dial readings and the pointer 57 coacts with these graduations.

The unit may be assembled at the factory and adjustments made so that at average room temperatures, the temperature graduations on the dial will indicate the temperatures which will be maintained in the oven. Such adjustments are delicate as with the structure shown, a difference of .001 of an inch in the cams surface with relation to the sleeve will result in the variation of 5° F. It is thus seen that a regulator consisting of a number of parts assembled by unions and pipes may easily get out of adjustment and is difficult to adjust on the job. If after installation of a regulator, it is found that the oven temperature does not conform to the temperature readings at which the regulator is set, then adjustment may be made by moving the dial. It will be noted that in Fig. 7 the readings are from 250° to 550°. The correction graduations are for intervals of 10°. If when the dial is set to read 400° it is found that the temperature in the oven is 410°, the dial should then be moved anti-clockwise one division on the correction scale and fixed. This will correct the operation.

What we claim is:—

1. A self contained heat regulator unit comprising a valve casing provided with a cylindrical bore and an inlet and an outlet, a valve seat member slidably mounted in said bore intermediate said inlet and outlet for longitudinal movement, means to manually control the position of said seat member, a reciprocating valve coacting with the valve seat member, an actuator rod for said valve disposed substantially concentric with said bore, and thermostatic means directly engaged with said rod, said thermostatic means being directly mounted on said casing.

2. A heat regulator comprising a valve casing provided with a central bore having a gas chamber at one end, and an inlet and an outlet, a valve seat member slidably mounted in said bore intermediate said inlet and outlet for longitudinal movement, a cam located within said chamber for actuation of said valve seat member, means to manually turn said cam and thereby control the position of said seat member, a reciprocating valve for said seat member having a valve stem, and a thermostatic leaf to be flexed by temperature variations engaged directly with said stem to actuate said valve.

3. A self contained heat regulator unit for cooking appliances having a casing with a bore and an inlet and an outlet, a valve seat member slidably mounted in said bore for longitudinal movement, means to manually control the position of said seat member, a reciprocating valve coacting with the valve seat member, an actuating rod for said valve, bearings in spaced relation for said rod to provide a counter pressure chamber and prevent gas leakage, and thermostatic means directly engaged with said rod, said thermostatic means being directly mounted on said casing.

4. A self contained heat regulator unit for cooking appliances comprising a casing having a central bore, said casing having a gas chamber at one end of the bore and an inlet and an outlet, a slidable sleeve in said bore having a valve seat interposed between said inlet and outlet, a cam mounted in said chamber directly engaged with said sleeve to actuate the latter, a reciprocating automatic valve in said sleeve coacting with said seat, an actuating rod for said automatic valve projecting through said casing, a thermostatic actuator mounted on said casing directly engaged with said rod, a shaft for rotating said cam, a dial for rotation with said shaft, said dial having temperature graduations marked thereon, and means securing said dial to said shaft for adjustment of its angular position thereon and thereby the graduations.

5. A self contained heat regulator unit for cooking appliances comprising a casing having a central bore, a plate extending from the casing laterally of and adjacent to the end of the bore, said casing having a gas chamber at the other end of the bore and an inlet and an outlet, a slidable sleeve in said bore having a valve seat interposed between said inlet and outlet, a cam mounted in said chamber directly engaged with said sleeve to actuate the latter, a reciprocating automatic valve in said sleeve coacting with said seat, an actuating rod for said automatic valve projecting through said casing, a thermostatic leaf member mounted on said plate extending at right angles to and directly engaged with said rod, a shaft for rotating said cam, and means to indicate the angular position of said shaft.

6. A self contained heat regulator unit for cooking appliances comprising a casing having a central bore, said casing having a gas chamber at the one end of the bore and an inlet and an outlet, a slidable sleeve in said bore having a valve seat interposed between said inlet and outlet, a cam mounted in said chamber directly engaged with said sleeve to actuate the latter, a reciprocating automatic valve in said sleeve coacting with said seat, an actuating rod for said automatic valve projecting through said casing, a thermostatic leaf member mounted on said casing extending at right angles to and directly engaged with said rod, a shaft for rotating said cam extending axially therefrom, and a dial mounted on said shaft for rotation therewith, said dial having temperature graduations marked thereon.

7. A self contained heat regulator unit for cooking appliances comprising a casing having a central bore, a plate extending from the casing laterally of and adjacent to the end of the bore, said casing having a gas chamber at the other end of the bore and an inlet and an outlet, a slidable sleeve in said bore having a valve seat interposed between said inlet and outlet, a cam in said chamber directly engaged with said sleeve to actuate the latter, a reciprocating automatic valve in said sleeve coacting with said seat, an actuating rod for said automatic valve projecting through said casing, a thermostatic actuator mounted on said plate extending at right angles to and directly engaged with said rod, a shaft for rotating said cam extending axially therefrom, a dial for rotation with said shaft, said dial having temperature graduations marked thereon, and means securing said dial to said shaft for adjustment of its angular position thereon.

8. A heat regulator for cooking appliances comprising a casing having a central bore, a plate extending from the casing laterally of and adjacent to the end of the bore, said casing having a gas chamber at the other end of the bore and an inlet and an outlet, a slidable sleeve in said bore having a valve seat interposed between said inlet and outlet, a cam in said chamber directly engaged with said sleeve to actuate the latter, a reciprocating automatic valve in said sleeve coacting with said seat, an actuating rod for said automatic valve projecting through said casing, a thermostatic actuator mounted on said plate extending at right angles to and directly engaged with said rod, a shaft for rotating said cam, a dial for rotation with said shaft, said dial having temperature graduations marked thereon, means securing said dial to said shaft for adjustment of its angular position thereon, correcting graduations on said dial, and an indicator mounted on said shaft coacting with said correcting graduations.

9. A self contained heat regulator unit for cooking appliances comprising a casing having a central bore, said casing having a gas chamber at one end of the bore and an inlet and an outlet, a slidable sleeve in said bore having a valve seat interposed between said inlet and outlet, a cam mounted in said chamber directly engaged with said sleeve to actuate the latter, a reciprocating automatic valve in said sleeve coacting with said seat, an actuating rod for said automatic valve projecting through said casing, a thermostatic actuator mounted on said casing and directly engaged with said rod, means for rotating said cam, and means to indicate the angular position of said cam, there being a longitudinally extending by-pass in said casing placing said chamber and the outlet in communication.

10. A self contained heat regulator unit for cooking appliances comprising a casing having a central bore, a liner in said bore, said casing having a gas chamber at one end of the bore and an inlet and an outlet, a slidable sleeve in said bore having a valve seat interposed between said inlet and outlet, a cam mounted in said chamber directly engaged with said sleeve to actuate the latter, a reciprocating automatic valve in said sleeve coacting with said seat, an actuating rod for said automatic valve projecting through said casing, a thermostatic actuator mounted on said casing and directly engaged with said rod, means for rotating said cam and means to indicate the angular position of said cam, said liner having a longitudinally extending by-pass in its periphery placing said chamber and the outlet in communication.

11. A heat regulator for cooking appliances comprising a casing having a central bore, a liner in said bore, a plate extending from the casing laterally of and adjacent to the end of the bore, said casing having a gas chamber at the other end of the bore and an inlet and an outlet, a slidable sleeve in said bore having a valve seat interposed between said inlet and outlet, a manually rotatable member in said casing extending into said chamber, a cam mounted on said member directly engaged with said sleeve to actuate the latter, a reciprocating automatic valve in said sleeve coacting with said seat, a stem on said automatic valve projecting through said casing, bearings in spaced relation for said stem providing a counter pressure chamber therebetween, a bimetallic thermostatic actuator mounted on said plate extending at right angles to and directly engaged with said stem, a dial for rotation with said member, said dial having temperature graduations marked thereon, means securing said dial to said member for adjustment of its angular position thereon, correcting graduations on said dial, an indicator mounted on said member coacting with said correcting graduations, said liner having a longitudinally extending channel in its periphery placing said chamber and outlet in communication.

12. A self contained combination gas cock and heat regulator unit for cooking appliances comprising a casing having a central bore, said casing having a gas chamber at one end of the bore and an inlet and an outlet, a slidable sleeve in said bore having a valve seat interposed between said inlet and outlet, a gas cock in said casing, a cam in said chamber directly engaged with said sleeve to actuate the latter, said gas cock controlling the supply of gas from said inlet to said chamber and having a range of movement in open position, means for turning said cam with movement of said gas cock, a reciprocating automatic valve in said sleeve coacting with said seat, an actuating rod for said automatic valve projecting through said casing, a thermostatic actuator mounted on said casing and directly engaged with said rod, and means to indicate the position of said cam.

13. A combination gas cock and heat regulator for cooking appliances comprising a casing having a central bore, said casing having a gas chamber at one end of the bore and an inlet and an outlet, a slidable sleeve in said bore having a valve seat interposed between said inlet and outlet, a rotatable gas cock in said casing having an extension disposed in said chamber, a cam mounted on said extension directly engaged with said sleeve to actuate the latter, said gas cock controlling the supply of gas from said inlet to said chamber and having an angular range of movement in open position, a reciprocating automatic valve in said sleeve coacting with said seat, a stem on said automatic valve projecting through said casing, a thermostatic actuator mounted on said casing and directly engaged with said stem, a shaft for rotating said plug extending axially therefrom, and a dial mounted on said shaft for rotation therewith, said dial having temperature graduations marked thereon.

14. A combination gas cock and heat regulator for cooking appliances comprising a casing having a central bore, said casing having a gas chamber at one end of the bore and an inlet and an outlet, a slidable sleeve in said bore having a valve seat interposed between said inlet and outlet, a rotatable gas cock in said casing having an extension disposed in said chamber, a cam mounted on said extension directly engaged with said sleeve to actuate the latter, said gas cock controlling the supply of gas from said inlet to said chamber and having an angular range of movement in open position, a reciprocating automatic valve in said sleeve coacting with said seat, a stem on said automatic valve projecting through said casing, a thermostatic actuator mounted on said casing and directly engaged with said stem, a shaft for rotating said plug extending axially therefrom, a dial for rotation with said shaft, said dial having temperature graduations marked thereon, and means securing said dial to said shaft for adjustment of its angular position thereon and thereby its graduations.

15. A combination gas cock and heat regulator for cooking appliances comprising a casing having a central bore, a plate extending from the casing laterally of and adjacent to the end of the bore, said casing having a gas chamber at the other end of the bore and an inlet and an outlet, a slidable sleeve in said bore having a valve seat interposed between said inlet and outlet, a rotatable gas cock in said casing having an extension disposed in said chamber, a cam mounted on said extension directly engaged with said sleeve to actuate the latter, said gas cock controlling the supply of gas from said inlet to said chamber and having an angular range of movement in open position, a reciprocating automatic valve in said sleeve coacting with said seat, a stem on said automatic valve projecting through said casing, a thermostatic leaf member mounted on said plate extending at right angles to and directly engaged with said stem, a shaft for rotating said plug extending axially therefrom, and means to indicate the angular position of said shaft.

16. A combination gas cock and heat regulator for cooking appliances comprising a casing having a central bore, a plate extending from the casing laterally of and adjacent to the end of the bore, said casing having a gas chamber at the other end of the bore and an inlet and an outlet, a slidable sleeve in said bore having a valve seat interposed between said inlet and outlet, a rotatable gas cock in said casing having an extension disposed in said chamber, a cam mounted on said extension directly engaged with said sleeve to actuate the latter, said gas cock controlling the supply of gas from said inlet to said chamber and having an angular range of movement in open position, a reciprocating automatic valve in said sleeve coacting with said seat, a stem on said automatic valve projecting through said casing, a thermostatic leaf actuator mounted on said plate extending at right angles to and directly engaged with said stem, a shaft for rotating said plug extending axially therefrom, a dial for rotation with said shaft, said dial having temperature graduations marked thereon, and means securing said dial to said shaft for adjustment of its angular position thereon.

17. A combination gas cock and heat regulator for cooking appliances comprising a casing having a central bore, said casing having a gas chamber at one end of the bore and an inlet and an outlet, a slidable sleeve in said bore having a valve seat interposed between said inlet and outlet, a rotatable gas cock in said casing, a cam mounted operated by said gas cock and directly engaged with said sleeve to actuate the latter, said gas cock controlling the supply of gas from said inlet to said chamber and having an angular range of movement in open position, a reciprocating automatic valve in said sleeve coacting with said seat, an actuating rod for said automatic valve projecting through said casing, a thermostatic actuator mounted on said casing and directly engaged with said rod, a shaft for rotating said plug, a dial for rotation with said shaft, said dial having temperature graduations marked thereon, means securing said dial to said shaft for adjustment of its angular position thereof, correcting graduations on said dial, and an indicator mounted on said shaft coacting with said correcting graduations.

18. A combination gas cock and heat regulator for cooking appliances comprising a casing having a central bore, a plate extending from the casing laterally of and adjacent to the end of the bore, said casing having a gas chamber at the other end of the bore and an inlet and an outlet, a slidable sleeve in said bore having a valve seat interposed between said inlet and outlet, a rotatable gas cock in said casing having an extension disposed in said chamber, a cam mounted on said extension and directly engaged with said sleeve to actuate the latter, said gas cock controlling the supply of gas from said inlet to said chamber and having an angular range of movement in open position, a reciprocating automatic valve in said sleeve coacting with said seat, an actuating rod for said automatic valve projecting through said casing, a thermostatic leaf actuator mounted on said plate extending at right angles to and directly engaged with said rod, a shaft for rotating said plug extending axially therefrom, a dial for rotation with said shaft, said dial having temperature graduations marked thereon, means securing said dial to said shaft for adjustment of its angular position thereon, correcting graduations on said dial, an indicator mounted on said shaft coacting with said correcting graduations, there being a by-pass in said casing placing said chamber and the outlet in communication.

JOHN H. GRAYSON.
FREDERICK A. STRAUB.